United States Patent
Yegoshin (12)

(10) Patent No.: US 6,373,937 B1
(45) Date of Patent: *Apr. 16, 2002

(54) METHOD AND APPARATUS FOR LOAD-BALANCING OF CALL PROCESSING BETWEEN MULTIPLE CALL-DESTINATION SITES AND ROUTING OF CALLS BY WAY OF CALL-DESTINATION SITE CONTROL

(75) Inventor: Leonid A. Yegoshin, Palo Alto, CA (US)

(73) Assignee: Genesys Telecommunications Laboratories Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/660,533

(22) Filed: Sep. 13, 2000

Related U.S. Application Data

(62) Division of application No. 09/216,556, filed on Dec. 18, 1998, now Pat. No. 6,122,365.

(51) Int. Cl.[7] ............................................. H04M 3/523

(52) U.S. Cl. .......................... 379/266.01; 379/265.09; 379/265.11; 379/269

(58) Field of Search ................................. 379/201, 209, 379/210, 211, 212, 214, 219, 220, 265, 266, 269, 309, 201.01, 209.01, 210.01, 211.01, 211.02, 212.01, 214.01, 220.01, 265.01, 265.02, 265.09, 265.11, 266.01, 900

(56) References Cited

U.S. PATENT DOCUMENTS 6,002,760 A * 12/1999 Gisby ...................... 379/265 X
6,122,365 A * 9/2000 Yegoshin ..................... 379/266

* cited by examiner

Primary Examiner—Harry S. Hong
(74) Attorney, Agent, or Firm—Donald R. Boys; Central Coast Patent Agency, Inc.

(57) ABSTRACT

A telephone switching and routing system has a first switching apparatus for receiving incoming calls, a first processor connected to the first switching apparatus, and a plurality of destination sites each connected to the first switching apparatus by a telephony trunk, each destination site including a destination processor coupled to the first processor by a communication link separate from the telephony trunk. The first processor connected to the first switching apparatus maintains a list of incoming calls received at the first switching apparatus as a virtual queue, wherein individual ones of the destination processors at the destination sites monitor local agent status and skill sets, and request switching of calls from the published lists as agents become available to handle new calls, and the first processor in response to requests from the destination processors controls the first switching apparatus to switch calls to the requesting destination sites. In some systems there are intermediate processors dedicated to maintaining all or portions of the virtual queue, and calls received at plural switches may be replicated in such virtual queues maintained at one or plural sites. The intermediate processors negotiate with destination processors which request (pull) calls from the queue, and the queue is maintained according to new calls received at any switch and calls switched on at any switch.

7 Claims, 1 Drawing Sheet

METHOD AND APPARATUS FOR LOAD-BALANCING OF CALL PROCESSING BETWEEN MULTIPLE CALL-DESTINATION SITES AND ROUTING OF CALLS BY WAY OF CALL-DESTINATION SITE CONTROL

CROSS-REFERENCE TO RELATED DOCUMENTS

The present application is a Divisional of Ser. No. 09/216,556 U.S. Pat. No. 6,122,365 filed Dec. 18, 1998, herein incorporated in its entirety by reference.

FIELD OF THE INVENTION

The present invention is in the field of Computer-Telephony Integration (CTI) call processing and switching including CTI call processing and switching of Internet protocol (IP)-sourced communication, and pertains more particularly to methods and apparatus for distributing call processing duties among multiple destination sites and routing of calls by way of call-destination site control.

BACKGROUND OF THE INVENTION

The present invention relates in preferred embodiments to call-centers in the art of telephony systems. Call centers are typically hosted by a company or organization for purposes of providing a service to clients, such as technical assistance or catalogue sales and the like. In a typical call center agents are employed at agent stations having at least one telephone, and in many cases other equipment, such as a personal computer with a video display unit (PC/VDU).

Modem call centers, more appropriately termed communication centers, typically have call-switching equipment for directing incoming calls to telephones at agent stations. Computer integration with the switching equipment is now common. This technique is known in the art as computer telephony integration (CTI). In a CTI system a processor is connected to the switching apparatus by a CTI link, and the processor runs CTI applications monitoring and controlling the switching apparatus. PC/VDUs at agent stations may be interconnected on a local area network (LAN) also connected to the CTI processor.

Development of CTI communication centers has made it possible for agents to interact with callers (clients) in more ways than just by telephone. In a suitably equipped communication center, agents can operate with E-mail, Video mail, Video calls, and Internet Protocol Network Telephony (IPNT) calls as well as connection-orientated-switched-telephony (COST) calls. Further to the above, such a modern communication center may also be linked to other communication centers, data bases, and the like in a variety of ways, such as by COST networks, local area networks (LAN), wide area networks (WAN), including the World Wide Web (WWW), and various other types of linked-computer networks, such as wireless, satellite based, etc.

A communication center is typically organized to receive and distribute incoming calls to a plurality of agents at the center. There may be a large volume (rate) of incoming calls and a large number of agents. As described above, calls are not limited to COST calls, but may include communications of many other sorts. Call routing to and within communication centers involves processors and software dedicated to directing calls to appropriate agents for processing and response.

Routing of calls, then, may be on several levels. Pre-routing may be done at Service Control Points (SCPs) or other network access points, gateways, or switches at the network level and further routing may be, and generally is, accomplished at individual communication centers.

Distribution and routing of telephone calls within a connection-orientated-switched-network (COST) is not limited to plain old telephony service (POTS)-sourced calls. Calls sourced from other types of networks such as any packet data network, termed herein Data Network Telephony (DNT) calls, may arrive into a COST network through a gateway bridging the two networks. Such gateways are adapted for protocol conversion such that all bridged calls to a COST network are converted to COST format for switching and processing according to appropriate conventions.

In current art call distribution at the network level, calls arriving at a first telephony switch are typically routed on to other switches in the network before ultimately arriving at final destination switches local to or within communication centers. These intermediate switches are often referred to as hops by those familiar with the art. Often these intermediate switches are limited in routing capability with routing performed according to information stored locally at each switch. Such information may simply be the destination of the next intermediate switch on a path to the final destination. As a result, a call may experience several hops on the way to it's final destination. Such hops may require that a call be held in queue while awaiting further instruction, and in any case may entail delays and expensive processing.

An inconvenience associated with such architecture is that it is expensive to maintain such intermediate equipment. Costs associated with maintaining such equipment are generally factored in to direct costs to call-center hosts who lease such equipment for load balancing purposes or other call processing services that may be offered by a host network provider.

What is clearly needed is a method and apparatus for load-balancing of call-processing duties between multiple destination sites and routing of calls that is controlled by each destination site. Calls in such a system could be pulled from network equipment rather than pushed from network equipment. Such a method and apparatus would eliminate or greatly reduce the use of intermediate switching apparatus at or below network level thereby eliminating associated costs. Such a method and apparatus would also allow for less intelligence to be implemented at enhanced first-destination switches such as SCP points.

SUMMARY OF THE INVENTION

In a preferred embodiment of the present invention a call switching and routing system is provided, comprising a first switching apparatus for receiving incoming calls; a first processor connected to the first switching apparatus; and a plurality of destination sites each connected to the first switching apparatus by a telephony trunk, each destination site including a destination processor coupled to the first processor by a communication link separate from the telephony trunk. The first processor connected to the first switching apparatus maintains a list of incoming calls received at the first switching apparatus as a virtual queue, wherein individual ones of the destination processors at the destination sites monitor local agent status and skill sets, and request switching of calls from the published lists as agents become available to handle new calls, and the first processor in response to requests from the destination processors controls the first switching apparatus to switch calls to the requesting destination sites.

In some embodiments there are one or more intermediate processors connected to the first processor and to one or more of the destination processors by communication links other than the telephony trunks, and the intermediate processor or processors maintain copies of the virtual queue and interact with destination processors to route calls held at the first switching apparatus.

In some embodiments individual ones of the destination sites include a destination switching apparatus monitored and controlled by the destination processor, the destination switching apparatus for receiving calls from the first switching apparatus and switching the calls to connected agents under control of the destination processor. Also, in some embodiments there may be an IP-to-COST gateway for receiving calls from an IP network and forwarding the IP calls to the first switching apparatus as COST calls.

In some embodiments there are plural first switching apparatus connected to plural first processors, the plural first processors interconnected to plural intermediate processors interconnected to destination processors at plural destination sites, providing thereby a distributed system, wherein one or more virtual queues are formed and maintained on individual ones of the first and intermediate processors from calls received at individual ones of the plural first switching apparatus, and wherein the destination processors may negotiate with any one of the first or intermediate processors for call switching, and the virtual queues are maintained according to calls received and calls switched at all of the first switching apparatus.

In an aspect of the invention a telephony processor for a telephone switching and routing system is provided, comprising a computer-telephony-integration (CTI) link for connection to a switching apparatus; a digital communication link separate from the CTI link for communication with remote digital processors; and a CTI application for establishing a virtual queue from data received from a telephony switching apparatus over the CTI link. The CTI application forms a queue list representing calls received at a switching apparatus connected to the CTI link, negotiates with the remote processors over the separate digital link for assignment of queued calls, and forms and transmits commands on the CTI link to the connected switching apparatus to switch calls to destinations according to the negotiations with the remote digital processors. In some cases the processor is a first processor in a connected processor system, and the virtual queue is copied to and maintained on remote processors connected to the first processor by the separate digital communication link.

In yet another aspect of the invention method for switching and routing telephone calls is provided, comprising steps of (a) receiving calls at a first switching apparatus; (b) transferring data about the received calls to a first processor connected to the switching apparatus; (c) forming a virtual queue of received calls from the data from the first switching apparatus; (d) negotiating, by the first processor, with destination processors at candidate destination sites, the candidate destination sites requesting calls from the virtual queue; (e) commanding the first switching apparatus by the first processor to switch calls to the destination sites according to the negotiations; and (f) updating the virtual queue as new calls are received and received calls are switched.

In some embodiments of the method there is a step for establishing all or a portion the virtual queue at intermediate processors connected to the first processor, wherein the intermediate processors may also interact with destination processors for call switching decisions. Also in some embodiments individual ones of the destination sites may include a destination switching apparatus monitored and controlled by the destination processor, including a step for receiving calls from the first switching apparatus and switching the calls to connected agents under control of the destination processor. There may also be an IP-to-COST gateway for receiving calls from an IP network and forwarding the IP calls to the first switching apparatus as COST calls.

In embodiments of the present invention, for the first time a system is provided wherein two-bounce routing is established and maintained, avoiding intermediate switching of calls, and also allowing enhanced efficiency of destinations negotiating for (pulling) calls from a distributed virtual queue.

DESCRIPTION OF THE PREFERRED EMBODIMENTS

Figure 1:
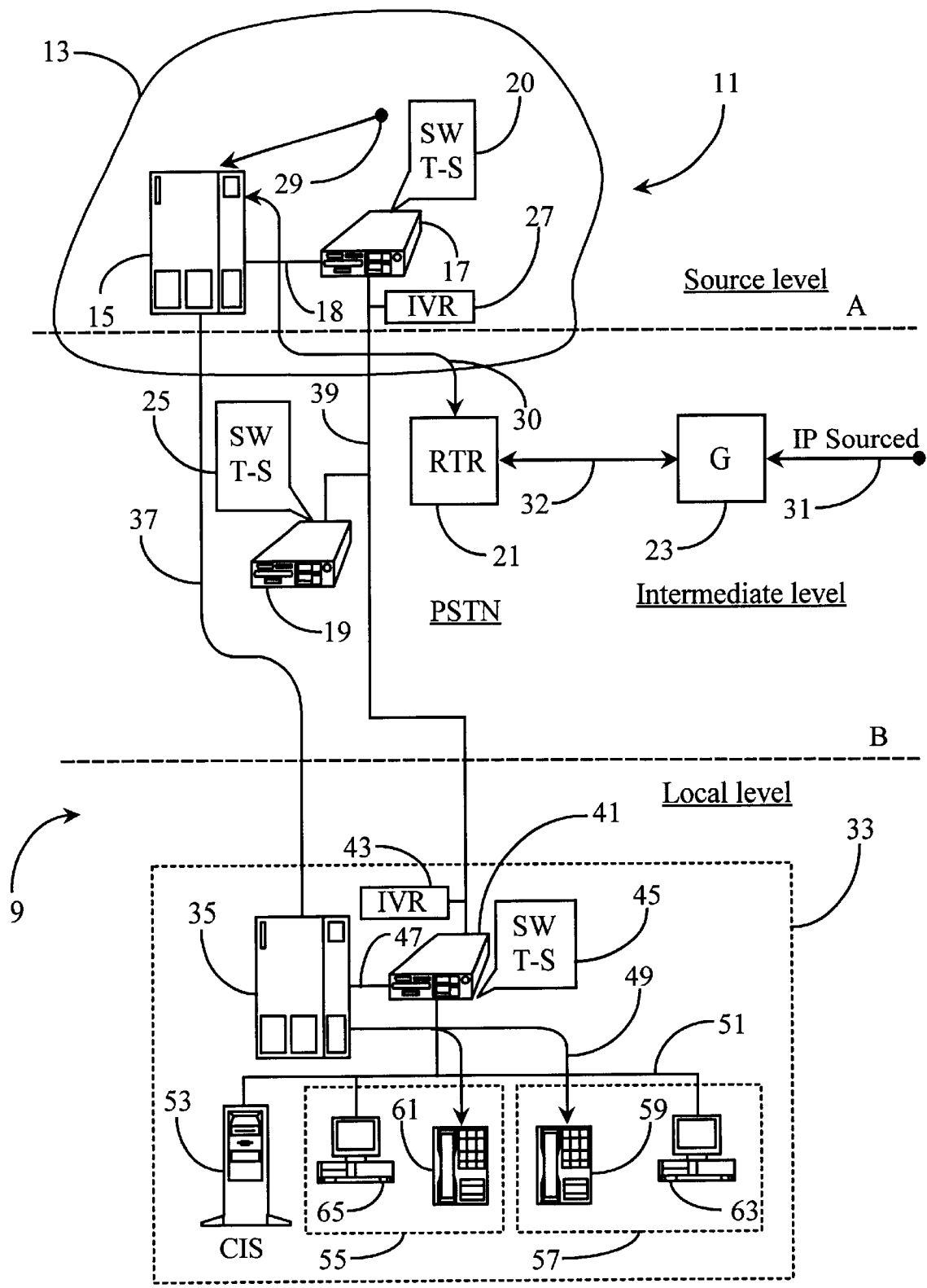
FIG. 1 is an overview of a telecommunication and call routing system according to an embodiment of the present invention.

FIG. 1 is an overview of a telecommunication system 9 enhanced with a routing system 11 according to a preferred embodiment of the present invention. Telecommunications system 9 in this example comprises COST network 13, routing system 11, and a communication center (call center) 33. COST network 13 is, in this example, a public-switched-telephony-network (PSTN), however, in some embodiments network 13 may be a private switched network. Communication center 33 represents any CTI-enhanced call-in location such as an office, service center, store, and so on, as an end-destination for calls 29 received at switch 15. In a preferred embodiment center 33 is associated with other like centers or locations hosted by a single company or a company cooperative. Such centers may also be linked via LAN or WAN as described above in the Background section.

In this example, telecommunications network 9 is logically divided into three call-processing levels as illustrated by dotted dividing lines labeled A and B. For example, the area above line A illustrates a source processing-level within COST network 13. This level defines an area and equipment where incoming calls, represented by a vector 29, arrive and are typically pre-processed before further routing. A source-site telephony switch 15 represents a first destination for calls 29 arriving from anywhere in COST network 13. In prior art architecture, data regarding incoming calls is communicated to computerized equipment broadly known in the art as a Service Control Point, which may employ IVR technology, databases, and the like to determine a next destination for each call, and the SCP informs the first switch of the destination, and the first switch then switches the call.

Switch 15 is enhanced in this embodiment by a CTI processor 17 with connection established via a CTI link 18. Processor 17 is adapted to monitor and control certain call-related functions and attributes of switch 15 via execution of an instance of installed software (SW) 20 according to an embodiment of the present invention. Software 20 is adapted to compile and create data about calls 29 and to publish such data for access by participating communication centers such as center 33. Software 20 is known as a T-Server application suite by the inventor.

An intelligent peripheral, in this case an interactive voice-response unit (IVR) 27, is provided and adapted to interface with callers placing calls arriving at switch 15. IVR 27 may use any known technology for effecting caller interaction such as voice recognition, touch tone response, and so on. IVR 27 typically solicits additional information from callers and may pass such information on to a call destination via a separate digital link. An intermediate processing level is defined as the area and equipment within network 13 that is illustrated between line A and line B. In this region a processor 19 is provided and implemented. Note that processor 19 is not connected to any intermediate switching apparatus as was described according to prior art practice in the background section. Rather, processor 19 provides a unique queuing apparatus termed a virtual queue by the inventors. An instance of software 25 of the present invention is provided and adapted to execute on processor 19. Software 25 is adapted to maintain for access a published call list comprising call-data compiled by software 20 running on processor 17. Data in the call list is organized and associated with each instance of a call received and waiting at switch 15, such that when a new call arrives at switch 15, new data is compiled and made a part of the call list maintained by software instance 25. This virtual queue capability enables information about calls to be accessible at the intermediate level without actually switching any calls into any intermediate-level switching apparatus. Processor 17 is connected to processor 19 via a data-link 39. Processor 19 has a further capability of communicating intelligent routing decisions to Processor 17 which controls switch 15 by virtue of an instance of T-S software which was described above.

In some embodiments of the invention software 20 and 25 execute on a single processor such as processor 17, and the call list of the invention is published at the source level, rather than at an intermediate level. In other embodiments the are multiple intermediate-level processors interconnected with multiple end-destinations such as center 33.

Also illustrated at the intermediate level in this example is a communication gateway-bridge (G) 23 which is adapted in this case as a bridge between a switched-packet data-network, such as, perhaps, the Internet, and COST network 13. In this way, IP calls represented by a vector 31 may enter network 13 as newly-converted COST calls, or alternatively (not shown in Figure), the IP calls could be delivered directly to IP enabled mini-centers such as center 33, and only call availability may be communicated to the top layer. Such gateways or bridges, as well as other architecures to the same end are known by and available to the inventor. A router 21 is provided and connected to gateway 23 via a telephony trunk 32. Router 21 is adapted to route IP-sourced calls 31 to switch 15 by way of a telephony trunk 30. At switch 15, incoming IP calls are processed as normal COST calls.

Gateway 23 and router 21 may be provided at the source level instead of at the intermediate level. Furthermore, IP sourced calls 31 may be held at gateway 23 instead of routed to switch 15 provided that capabilities, including routing capability, are included in gateway 23 to enable function as a first destination switch similar to switch 15. Such addition of functionality would eliminate the need for router 21 and trunk 30. However, a processor running an instance of the software of the present invention, such as processor 17, and a data-link would be required to establish a connection between gateway 23 and processor 19. Also, a telephony trunk would be required to establish a telephony connection between gateway 23 and a destination site such as communication center 33. For the purpose of maintaining simplicity of FIG. 1, the inventor has chosen to illustrate routing of all incoming IP calls 31 to switch 15 as shown.

Illustrated below line B is a local call-processing level defined as the area and equipment defining the premise of communication center 33 and any other linked communication centers or sites that may be present in a distributed architecture as described above. Communication center 33 is exemplary of many such final destinations for calls, and comprises in this example a central telephony switch 35 that is adapted to receive calls from the network level, although a switching apparatus of this sort is not required for practicing the invention. Switch 15 is connected to switch 35 via a telephony trunk 37. Switch 35 may be an ACD type switch or another known type of switch. A CTI processor 41 is connected to switch 35 by a CTI link 47. An instance of software 45 of the present invention is provided and executable on processor 41. Software 45 is adapted to enable processor 41 to monitor processor 19 in the intermediate level of network 13 via data-link 39, and access data from a call-list maintained by software instance 25 (Virtual Queue). An IVR 43 is provided and connected to processor 41 via link 39. IVR 43 is adapted to interact with callers in the same fashion described with IVR 27 above. An instance of T-S software is also provided to execute on processor 41 and may communicate with other instances via link 39 as described above.

Communication center 33 also comprises multiple agent-workstations such as stations 55 and 57. Agent workstations 55 and 57 each support a switch-connected agent telephone with connection to switch 35 established by internal telephone wiring 49. Agent telephone 61 is implemented at station 55 while agent telephone 59 is implemented at station 57. Agent stations 55 and 57 are connected to each other and to a customer-information-system (CIS) server 53 by a local area network (LAN) 51. LAN connection is established at each station (55 and 57) by way of agent's PC/VDU's 65 and 63. PC/VDU 65 is implemented at agent station 55, and PC/VDU 63 is implemented at agent station 57.

It will be apparent to one with skill in the art that there may be many more agent stations and connected communication equipment established in a communication center such as center 33 without departing from the spirit and scope of the present invention. The inventor considers two agent stations and connected equipment adequate for the purpose of explaining the present invention. CIS server 53 is not specifically required to practice the present invention, but is provided as a convenience. CIS server 53 may store information related to callers such as account history, purchase history, address information, and so on. Other types of destination sites or locations such as ticket offices, stores, business offices and so on may practice the present invention as long as CTI enhancement is made at a local and intermediate level, and suitable communication equipment is provided.

Software of the present invention as illustrated by instance 20 running on processor 17, instance 25 running on processor 19, and instance 45 running on processor 41 is adapted to work in an integrated fashion to effect a call-pulling technology wherein all incoming calls 29 and 31 are physically held at switch 15 until pulled by a destination center such as center 33 when an agent at the communication center is available for connection. Software instance 45 determines which calls 29 or 31 being held at switch 15 will be routed to switch 35 by selecting or pulling the call-data associated with a call from the published call-list maintained by software instance 25 running on processor 19.

Software instance 20 executable on processor 17 monitors the status of incoming calls 29 and 31 at switch 15. Actual call parameters such as destination-number-identification-service (DNIS) parameters and automated-number-identification (ANI) parameters are converted into a set of parameters which may be coded or encrypted and made a part of a published call list, or tokenized and made a part of a virtual queue maintained first by software instance 20 running on processor 17 at the source level Such code identifies the destination and origination numbers for each call. Additional information such as purpose of the call, language requirement, and so on, and other like information that may be obtained through IVR 27 may also be associated with the call event as coded data for publishing.

The data about incoming calls 29 and 31 is sent to processor 17 where software instance 20 incorporates the supplied data into a call-list that is stored and continually updated as new calls arrive at switch 15 and calls at switch 15 are connected to final destinations. Software instance 20 prepares and maintains a virtual queue system wherein only call data is available. Calls are held at switch 15 (and like enhances switches at source level, until routing is determined in negotiation ultimately with software 45 at end destination.

Processor 41 at call center 33 and at other equivalent centers and end destinations periodically or continuously checks the call list and selects calls based on the assigned parameters which match criteria known by software instance 45 running on processor 41 within communication center 33. Software 45 operates on a basis of monitoring availability of agents and their skill sets, and pulls calls based on the type of calls needed for efficiency as agents become available to handle new calls.

Each connected communication center or destination site maintains it's own call identification criteria for selecting which calls on the published list should be switched to that site. Such criteria will match criteria compiled at the time of call arrival at the source level. Criteria may include such as destination number and origination number identification, IVR solicited code words, numbers, or extension numbers, agent skill set, and so on. In some embodiments a single list will be published for all sites. In other embodiments, several lists may be provided for separate sites. In keeping with a distributed architecture, such lists may also be associated with separate processors and software in the intermediate level such as processor 19. One with skill in the art will recognize and appreciate such possibilities.

In a preferred embodiment an organization or company that has many and varied sites, perhaps thousands of end destinations for calls such as site 33, will have a large number of intermediate processors 19, each associated with a group of end sites 33. In this embodiment each intermediate site can pull a relevant portion of the overall call queues at sources enhanced to publish such lists, and each end destination will pull calls from the associated intermediate processor 19, which will pull calls from the source level published list or lists. The operating principle is that calls can come in at any enhanced source site, call lists may be published at distributed intermediate sites as determined by enterprise rules, and calls on a published list at either of a source or intermediate level can be pulled by equipment a final destination.

When a final destination selects a call from a source or intermediate list, the selection is communicated ultimately to the source level, and the source switch 15 is commanded to switch the call to the final destination, which may be a routing point in a switch at a call center. This call-pulling strategy ensures just two-bounce delivery, and enhances efficiency throughout the system. Now an enterprise with far-flung and diverse locations, for example an airline having many sites where agents perform a wide variety of services, can use agents at such sites to also serve customers as telephone agents when available to do so. The ability of such organizations to service their customers and clients is vastly improved.

In a preferred embodiment, a call is selected from list 25 only when an available agent at communication center 33 is open to receive the call. In a case where there are multiple destination sites such as communication center 33, then call data may be redistributed to another virtual queue, or mirrored to several queue lists associated with varying destination sites, as described above. If software 45 determines that an agent is available for a selected call from a call-list such as maintained by software instance 20 or 25, then a routing request is sent by processor 41 to processor 19, and then to processor 17 over data links such as data-link 39. Processor 17 executes a routing order to switch 15 via CTI link 18. Switch 15 then routes the call to the end destination over trunk 37. Once at switch 37 in this example, the call is immediately routed on to the available agent over internal wiring 49 to one of agent's telephones 61, or 63. In this way, the actual call is directly routed from source switch 15 to destination switch 35 (two hops). In a preferred embodiment only call data is kept at the intermediate levels in processors 19 and there are no intermediate switching apparatus used to hold calls for further routing.

With practice of the present invention, call processing duties may be distributed among several destination sites using distributed virtual queues thereby relieving source sites such as switch 15 of the burden. At the same time, costs may be reduced due to the fact that intermediate switching sites are not required.

IP-sourced calls 31 are handled identically as are calls 29 once they are held at switch 15. In some embodiments, IP calls 31 may be taken over LAN 51 provided that an IP switch and suitable network connectivity is provided in communication center 33. In this case, IP calls my be held at gateway 23 as described previously. Selected IP calls may trigger routing through the IP network to a LAN connected IP switch. There are many possibilities.

In a preferred embodiment, separate instances of software 20, 25, and 45 have capability of performing all of the software capability described and taught in this specification. This allows for changing the direction of communication. For example, an outbound call from communication center 33 may be destined to another center. In this case, switch 35 would function as a source site, and the outbound call would be held at switch 35 while call data is published at processor 19 which would be accessible from the target location software. This embodiment serves call-rerouting from one site to another.

In one embodiment, several destination sites such as center 33 may be clustered locally and share CTI capability from a single processor, and perhaps share a single published call-list. Each site could mine it's own calls from the same list (virtual queue). There may be several source sites such as switch 15 sharing one data-call list. The only requirement for hardware distribution is that the instances of software (SW) according to embodiments of the invention cover all of the sites. For instance, if there are three source switches, two intermediate processors maintaining call lists, and four connected destination sites, then appropriate connection must be provided between instances of hardware so that covering software instances may cross-communicate freely. In keeping with a distributed architecture as described above, call processing duties may be distributed among destination sites and the use of intermediate switches may be eliminated. In real situations, as described in the example above, enterprises such as airline companies and others may have thousands of destination sites and distributed intermediate processing sites.

It will be apparent to one with skill in the art that the method and apparatus may be practiced in a distributed architecture without departing from the spirit and scope of the present invention. For example, several source sites may be connected to one or more intermediate level processors providing access to a multitude of destination sites.

It will also be apparent to one with skill in the art that destination sites such as communication center 33 may support varied communication hardware without departing from the spirit and scope of the present invention provided that CTI enhancement to source, intermediate and destination levels is provided wherein the software of the present invention may be suitably executed via connected processors. For example, one site may only support switch-connected telephones while another may support PC/VDU's, switch-connected telephones, and DNT capable telephones. There are many possible embodiments, many of which have already been described.

The spirit and scope of the present invention is limited only by the claims that follow.

What is claimed is:

1. An Internet Protocol Network Telephony (IPNT) call routing system, comprising:

an Internet Protocol (IP) gateway for receiving incoming IP calls;

a first processor connected to the (IP) gateway; and a plurality of destination sites each having an IP network connection to the IP gateway, each destination site including a destination processor having an Internet connection to the first processor;

wherein the first processor connected to the IP gateway maintains a list of incoming IPNT calls received at the IP gateway as a virtual queue and publishes the list to the destination processors, individual ones of the destination processors at the destination sites monitor local agent status and skill sets, and request routing of IPNT calls from the published lists as agents become available to handle new calls, and the first processor in response to requests from the destination processors controls the IP gateway to route IPNT calls to the requesting destination sites.

2. The IPNT call routing system of claim 1 further comprising one or more intermediate processors connected to the first IP processor and one or more of the destination processors, the intermediate processor or processors maintaining copies of the virtual queue and interacting with destination processors to route calls held at the IP gateway.

3. The IPNT call routing system of claim 2 wherein individual ones of the destination sites include a destination IP switching apparatus monitored and controlled by the destination processor, the destination IP switching apparatus for receiving calls from the IP gateway and switching the IPNT calls to connected agents under control of the destination processor.

4. The IPNT call routing system of claim 2 further comprising plural IP gateways connected to plural first processors, the plural first processors interconnected to plural intermediate processors interconnected to destination processors at plural destination sites, wherein one or more virtual queues are formed and maintained on individual ones of the first and intermediate processors from calls received at individual ones of the plural IP gateways and wherein the destination processors may negotiate with any one of the first or intermediate processors for IPNT call routing, and the virtual queues are maintained according to IPNT calls received and IPNT calls switched at all of the IP gateways.

5. A method for routing Internet Protocol Network Telephony (IPNT) calls, comprising steps of:

(a) receiving calls at an Internet Protocol (IP) gateway;

(b) transferring data about the received calls to a first processor connected to the IP gateway;

(c) forming a virtual queue of received calls from the data from the IP gateway;

(d) negotiating, by the first processor, with destination processors at candidate destination sites, the candidate destination sites requesting IPNT calls from the virtual queue;

(e) commanding the IP gateway by the first processor to switch calls to the destination sites according to the negotiations; and (f) updating the virtual queue as new IPNT calls are received and received IPNT calls are routed.

6. The method of claim 5 wherein individual ones of the destination sites include a destination IP switching apparatus monitored and controlled by the destination processor, including a step for receiving calls from the IP gateway and routing the calls to connected agents under control of the destination processor.

7. The method of claim 6 further comprising a step for establishing all or a portion the virtual queue at intermediate processors connected to the first processor, wherein the intermediate processors may also interact with destination processors for IPNT call routing decisions.

* * * * *